(12) United States Patent
Howard et al.

(10) Patent No.: US 7,007,110 B2
(45) Date of Patent: Feb. 28, 2006

(54) NAK THROTTLING FOR USB HOST CONTROLLERS

(75) Inventors: John S. Howard, Portland, OR (US); John I. Garney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 806 days.

(21) Appl. No.: 09/823,558

(22) Filed: Mar. 30, 2001

(65) Prior Publication Data

US 2002/0144040 A1    Oct. 3, 2002

(51) Int. Cl.
    *G06F 13/14* (2006.01)
(52) U.S. Cl. .................. 710/33; 710/100; 710/107
(58) Field of Classification Search .............. 710/116, 710/100, 33, 54, 63, 55, 58, 59, 105, 107, 710/113, 310; 714/44, 1, 3
    See application file for complete search history.

(56) References Cited

U.S. PATENT DOCUMENTS

| | | | |
|---|---|---|---|
| 4,103,148 A * | 7/1978 | Erickson | 377/10 |
| 6,073,193 A * | 6/2000 | Yap | 710/100 |
| 6,119,190 A * | 9/2000 | Garney | 710/310 |
| 6,311,294 B1 * | 10/2001 | Larky et al. | 714/44 |
| 6,606,674 B1 * | 8/2003 | Howard | 710/100 |

* cited by examiner

*Primary Examiner*—Khanh Dang
(74) *Attorney, Agent, or Firm*—Blakely, Sokoloff, Taylor & Zafman LLP

(57) ABSTRACT

A method and apparatus for traversing a schedule with a bus master, the schedule having a plurality of elements, each element having information pertaining to one of a plurality of endpoints; executing transactions on a bus in accordance with the information pertaining to the plurality of endpoints; counting flow control events issued by individual endpoints; and skipping elements in the traversal of the schedule, the elements being skipped corresponding to endpoints which have issued a threshold number of flow control events.

28 Claims, 3 Drawing Sheets

NAK THROTTLING FOR USB HOST CONTROLLERS

FIELD OF THE INVENTION

This invention relates generally to buses, and more particularly to managing bus resources.

BACKGROUND

The Universal Serial Bus (USB) is a half duplex single logical wire which permits relatively high speed serial communication between a host system bus and devices on the USB. The USB supports "USB devices" such as keyboards, joy sticks, pointing devices, mice and audio speakers. In order to execute transactions (i.e. data transfers) on the bus, the host controller must service a schedule, which is a set of data structures in shared memory. These data structures are known as elements, with one element corresponding to each endpoint/device coupled to the bus. One particular subset of elements is organized into a circular linked list, where each list element describes the control and buffer information for the host controller to conduct USB transactions to a particular device on the USB. The host controller services the schedule by repeatedly traversing the circular linked list executing bus transactions as appropriate. This means the host controller will read a list element, execute a transaction, and then write back the results to the element. It should be noted that a transaction will be executed only if the list element control bits indicate that it is appropriate (e.g. a buffer is available).

Additionally, the USB has flow control built into the bus protocol. Thus, the host controller will issue a request for data (e.g. a read), and the device will return either a data packet or a flow control handshake (e.g. flow control event) indicating that it does not currently have data available. Depending on the circumstances, this flow control event is known as a Nak or a Nyet, per Enhanced Host Controller Interface Specification for USB, Revision. 95, Nov. 10, 2000, available on the Internet at the following website: http://developer.intel.com/technology/usb/ehcispec.htm.

These flow control events are very short transactions. As described below, this can cause problems.

During operation, devices can issue flow control events much or even most of the time. There are two negative consequences to this behavior. First, the flow control events are very short, and when most, or all, of the devices represented in the schedule are mostly issuing flow control events, the host controller is able to traverse the circular list very quickly, occupying significant system bandwidth in the process. For example, a host controller following the protocol set forth in USB Specification, Version 1.0, Jan. 19, 1996, was measured utilizing 70% of the Peripheral Component Interconnect bus traversing the schedule but not moving any data. Second, the flow control events occupy bus time which could be used by other devices that have data to move.

DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

The present invention overcomes the problems in the existing art described above by providing a method and apparatus by which a bus master/host controller skips, during the traversal of a schedule, schedule elements which have issued a threshold number of flow control events. In the following description, for the purposes of explanation, numerous specific details are set forth in order to provide a thorough understanding of the present invention. It will be apparent, however, to one skilled in the art that the present invention may be practiced without some of these specific details. The following description and the accompanying drawings provide examples for the purposes of illustration. However, these examples should not be construed in a limiting sense as they are merely intended to provide exemplary embodiments of the present invention rather than to provide an exhaustive list of all possible implementations of the present invention. In other instances, well-known structures and devices are shown in block diagram form in order to avoid obscuring the details of the present invention.

In one embodiment, the present invention may be provided as a computer program product which may include a machine-readable medium having stored thereon instructions which may be used to program a computer (or other electronic devices) to perform a process according to an embodiment of the present invention. The machine-readable medium may include, but is not limited to, floppy diskettes, optical disks, CD-ROMs (compact disc-read-only memory), and magneto-optical disks, ROMs (read-only memory), RAMs (random access memory), EPROMs (erasable programmable read-only memory), EEPROMs (electrically erasable programmable read-only memory), magnet or optical cards, flash memory, or other type of media/machine-readable medium suitable for storing electronic instructions. Moreover, an embodiment of the present invention may also be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection).

Figure 1:
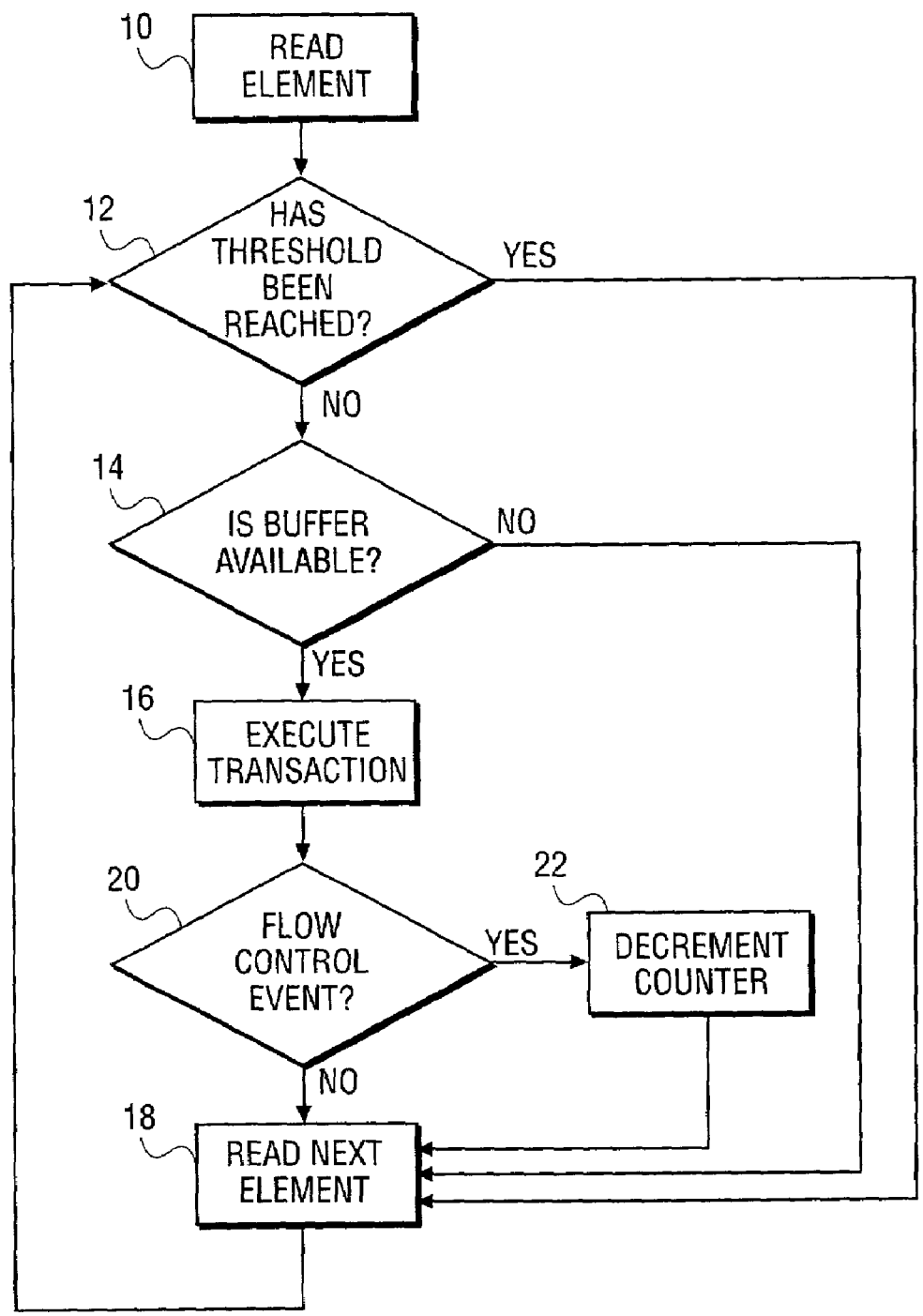
FIG. 1 is a flow chart of a method of traversing a schedule with a bus master/host controller.

Referring now to FIG. 1, a flow chart is shown which illustrates the manner in which an embodiment of the present invention services a schedule (after the first complete traversal of the schedule, discussed below). The bus master or host controller (terms can be used interchangeably as both govern bus resources) traverses the schedule by reading an element 10. Based on information read out of the element, the bus master then determines whether a threshold number 12 of flow control events has been issued by the corresponding endpoint. If the threshold number of flow control events has been reached, the bus master moves on to read the next element 18 in the schedule. If the threshold number of flow control events has not been reached, the bus master determines whether there is buffer available for a transfer by reading information 14 contained in the element. If there is no buffer available, the element is simply skipped and the bus master reads the next element. If there is buffering available, the bus master executes a transaction on the bus 16 in accordance with the type of data to be transmitted. If the device responds with a flow-control event 20, a counter 22 is decremented in the element. The consequences of a counter which reaches zero are discussed below. If the device has data to transmit, the counter in the element is not adjusted. The access pattern continues on in this fashion until certain events, discussed below, occur to stop or delay the traversal of the schedule.

Referring specifically now to the counter used by an embodiment of the present invention, it should be noted that the counter need not be contained in each of the elements. Rather, the counter could be located elsewhere in the system. In addition, although this embodiment shows a decrement of a counter when an endpoint responds with a flow control event, it is contemplated by the present invention to increment a counter until a threshold number of flow control events have been observed. Furthermore, the counter need not be linear (e.g. 2, 1, 0, reset, 2, 1, 0), but rather the counter could be circular (e.g. 2, 1, 0, 2, 1, 0) with no resetting needed. Moreover, the threshold number is programmable and can be variable or fixed, depending on the needs of the user.

As mentioned earlier, the bus master traverses the schedule executing transactions on the bus when buffering is available. In one embodiment, the present invention counts the number of flow control events issued (by decrementing a counter) such that when the counter reaches zero, the bus master "skips" that element during subsequent traversals (and so long as the counter is not reset). "Skipping" means that the bus master reads a zero in the counter for a particular element and moves on to the next element without making any attempt to execute a bus transaction to the endpoint/device associated with the element with a zero in its counter. In an embodiment with an incrementing counter rather than a decrementing counter, the element would be skipped when the bus master reads the threshold number in the counter. This algorithm is based on the idea that once an endpoint/device has issued a certain number of flow control events, it is unlikely that the endpoint will have data to move in the near future. Thus, the bus master saves bus time by skipping elements which have issued a threshold number of flow control events and rewarding elements that are willing to move data. In an alternative embodiment, the host system and/or bus master keep track of which endpoints have issued the threshold number of flow control events and skip their respective elements altogether, not even reading the counter.

Figure 2:
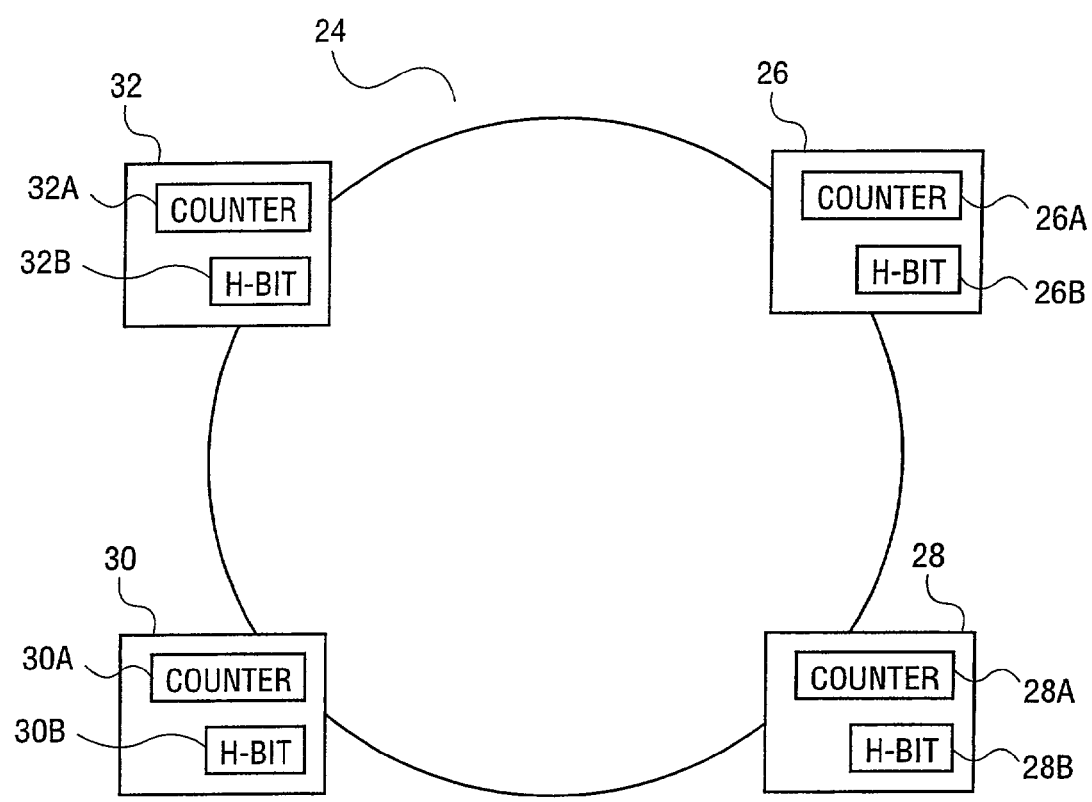
FIG. 2 is a diagram of a circular linked list of elements, which make up a schedule.

Referring now to FIG. 2 which shows a diagram of a sample schedule 24 which has four elements in a circular linked list, each element 26–32 contains information pertaining to a particular endpoint (not shown). When traversing the schedule 24, the bus master follows the pattern shown in FIG. 1. In an embodiment, the traversal of the schedule 24 stops upon the happening of one or more events. For instance, the bus master may cease traversal at the end of a USB microframe, when an empty list is detected, or when the schedule has been disabled. Regardless of the reason for stopping, the bus master can restart traversal of the schedule 24 after sitting idle for a period of time or when the bus master is required to service the schedule in the next USB microframe. As the bus master makes its first complete traversal of the schedule 24 upon starting, the bus master will reset each of the counters 26A, 28A, 30A, and 32A to an initial value. The initial value is programmable by the user. In an embodiment wherein the counter decrements, the initial value is set to a number other than zero. After the first complete traversal, the bus master follows the pattern set forth in FIG. 1 and does not reset any of the counters until traversal ceases and then subsequently resumes.

In accordance with one embodiment of the invention, the elements 26–32 may have a field by which the bus master can designate one of the elements 26–32 as a head or beginning of the list. For instance, if the bus master begins traversal of the schedule 24 of FIG. 2 by reading element 26, the bus master can signify element 26 as the head of the list by writing an indicator into the H-bit field 26B of element 26. Once element 26 is marked as the head, the bus master proceeds to service the remainder of the list. The purpose of identifying a head is so the bus master can stop traversal of the schedule if a full traversal of the schedule 24 is made without executing any bus transactions. Thus, if the bus master arrives back at the head element 26 after a full traversal of the schedule without executing any transactions, the bus master will cease traversal for some period of time. The period of idle time may be adjustable or fixed. In addition, the idle time could increase linearly or exponentially as the number of times the bus master goes idle increases during a USB microframe. Once the bus master "wakes" from this idle state, it can resume traversal of the schedule 24 and reset all element counters 26A–32A during the first traversal of the schedule as discussed earlier.

In accordance with one aspect of the invention, the bus master may stop traversal of the schedule 24 when all of the endpoints 26–32 have issued the threshold number of flow control events. The bus master then sits idle for a period of time before restarting (and possibly resetting counters 26A–32A) or until the end of the current USB microframe. Again, the idle time can be adjustable or fixed. In one embodiment, the idle time is fixed at 10 microseconds.

Figure 3:
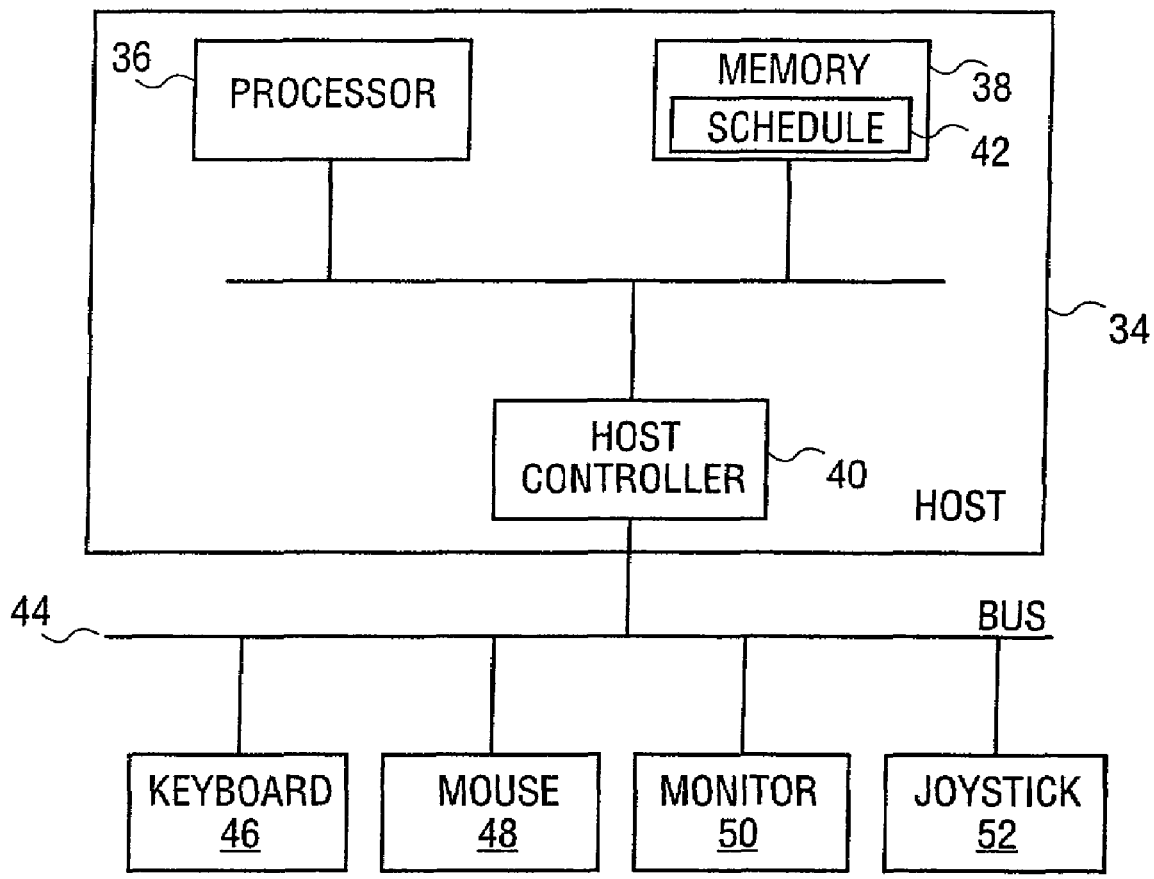
FIG. 3 is a diagram of a system according to the present invention.

Turning now to FIG. 3, a system is shown which is capable of implementing the method set forth above. A host 34 is shown which has a processor 36, a memory 38, and a bus master/host controller 40. The schedule 42 is located within the memory 38. It should be noted, however, that the schedule 42 could be located other than in memory 38 so long as the bus master/host controller 40 could access the schedule 42 in accordance with an embodiment of the present invention. The bus master/host controller 40 is coupled to a bus 44 with devices 46–52 attached to the bus 44. These exemplary devices 46–52 are a keyboard 46, a mouse 48, a monitor 50, and a joystick 52. Although not shown, the schedule 42 contains the list of elements, and each element contains information, including the counter, which pertains to each particular endpoint/device 46–52. Thus, the bus master/host controller 40 can access and traverse the schedule 42 in memory 38 and execute transactions on the bus 44 in accordance with information obtained from the elements in the schedule 42. Moreover, the bus master/host controller 40 can decrement the counter of any element in memory 38 which represents a device that issues a flow control event. When the threshold number of flow control events has been issued by a particular endpoint/device, the bus master/host controller 40 suspends service to that endpoint/device by "skipping" the device as discussed above.

As mentioned earlier, the counter can count in either a linear fashion or a circular fashion. Moreover, the schedule list of elements need not be a circular linked list. Rather, the schedule could be an array of elements through which the bus master traverses either by row, column, or any other suitable method.

In addition, although the preferred embodiment described herein is directed to USB, it will be appreciated by those skilled in the art that the teaching contained herein can be applied to other systems.

It is to be understood that even though numerous characteristics and advantages of various embodiments of the present invention have been set forth in the foregoing description, together with details of the structure and function of various embodiments of the invention, this disclosure is illustrative only. Changes may be made in detail, especially matters of structure and management of parts, without departing from the scope of the present invention as expressed by the broad general meaning of the terms of the appended claims.

We claim:

1. A method comprising:
   traversing a schedule with a bus master, the schedule having a plurality of elements, each element having information pertaining to one of a plurality of endpoints;
   executing transactions on a bus in accordance with the information pertaining to the plurality of endpoints;
   counting flow control events issued by individual endpoints; and
   skipping elements in the traversal of the schedule, the elements being skipped corresponding to endpoints which have issued a threshold number of flow control events.

2. The method of claim 1 further comprising:
   stopping traversal of the schedule by the bus master;
   resetting a flow control event counter for at least one endpoint to an initial value; and
   restarting traversal of the schedule by the bus master.

3. The method of claim 1 further comprising:
   marking an element as a head of the schedule;
   stopping traversal of the schedule by the bus master if, after marking an element as the head, the bus master completely traverses the schedule without executing any transactions; and
   restarting traversal of the schedule by the bus master.

4. The method of claim 3 further comprising:
   resetting a flow control event counter for at least one endpoint to an initial value.

5. The method of claim 1 further comprising:
   stopping traversal of the schedule by the bus master after all endpoints have issued the threshold number of flow control events; and
   restarting traversal of the schedule by the bus master.

6. The method of claim 5 further comprising:
   resetting a flow control event counter for at least one endpoint to an initial value.

7. The method of claim 5 wherein traversal of the schedule by the bus master is restarted after an adjustable amount of time.

8. The method of claim 5 wherein traversal of the schedule by the bus master is restarted after a fixed amount of time.

9. The method of claim 8 wherein the fixed amount of time is ten microseconds.

10. A machine-readable medium that provides instructions, which when executed by a machine, cause the machine to perform operations comprising:
    traversing a schedule with a bus master, the schedule having a plurality of elements, each element having information pertaining to one of a plurality of endpoints;
    executing transactions on a bus in accordance with the information pertaining to the plurality of endpoints;
    counting flow control events issued by individual endpoints; and
    skipping elements in the traversal of the schedule, the elements being skipped corresponding to endpoints which have issued a threshold number of flow control events.

11. The machine-readable medium of claim 10 which causes the machine to perform further operations comprising:
    stopping traversal of the schedule by the bus master;
    resetting a flow control event counter for at least one endpoint to an initial value; and
    restarting traversal of the schedule by the bus master.

12. The machine-readable medium of claim 10 which causes the machine to perform further operations comprising:
    marking an element as a head of the schedule;
    stopping traversal of the schedule by the bus master if, after marking an element as the head, the bus master completely traverses the schedule without executing any transactions; and
    restarting traversal of the schedule by the bus master.

13. The machine-readable medium of claim 12 which causes the machine to perform further operations comprising:
    resetting a flow control event counter for at least one endpoint to an initial value.

14. The machine-readable medium of claim 10 which causes the machine to perform further operations comprising:
    stopping traversal of the schedule by the bus master after all endpoints have issued the threshold number of flow control events; and
    restarting traversal of the schedule by the bus master.

15. The machine-readable medium of claim 14 which causes the machine to perform a further operation comprising:
    resetting a flow control event counter for at least one endpoint to an initial value.

16. The machine-readable medium of claim 14 wherein traversal of the schedule by the bus master is restarted after an adjustable amount of time.

17. The machine-readable medium of claim 14 wherein traversal of the schedule by the bus master is restarted after a fixed amount of time.

18. The machine-readable medium of claim 17 wherein the fixed amount of time is ten microseconds.

19. An apparatus comprising:
    a bus master to control transactions on a bus;
    a schedule to contain information about a plurality of endpoints, the endpoints to be coupled to the bus; and
    a counter to count flow control events issued by at least one of the plurality of endpoints, such that the bus master suspends service to an endpoint which has issued a threshold number of flow control events.

20. The apparatus of claim 19 wherein the counter counts in a linear fashion.

21. The apparatus of claim 19 wherein the counter counts in a circular fashion.

22. The apparatus of claim 19 wherein the schedule includes a circular linked list of elements, each element to contain information about a particular endpoint.

23. The apparatus of claim 19 wherein the schedule includes an array of elements, each element to contain information about a particular endpoint.

24. A system comprising:
   a processor;
   memory coupled to the processor;
   a bus coupled to the processor and to the memory;
   a bus master to control transactions on the bus;
   at least one endpoint coupled to the bus;
   a schedule to contain information about the at least one endpoint coupled to the bus; and
   a counter to count flow control events issued by the at least one endpoint, such that the bus master suspends service to an endpoint which has issued a threshold number of flow control events.

25. The apparatus of claim 24 wherein the counter counts in a linear fashion.

26. The apparatus of claim 24 wherein the counter counts in a circular fashion.

27. The apparatus of claim 24 wherein the schedule includes a circular linked list of elements, each element to contain information about a particular endpoint.

28. The apparatus of claim 24 wherein the schedule includes an array of elements, each element to contain information about a particular endpoint.

* * * * *